United States Patent
Frangenberg

(10) Patent No.: US 9,180,516 B2
(45) Date of Patent: Nov. 10, 2015

(54) ROLLER PRESS BIMETALLIC ANNULAR CASING

(75) Inventor: Meinhard Frangenberg, Kuerten (DE)

(73) Assignee: KHD HUMBOLDT WEDAG GMBH, Cologne (DE)

( * ) Notice: Subject to any disclaimer, the term of this patent is extended or adjusted under 35 U.S.C. 154(b) by 187 days.

(21) Appl. No.: 13/703,988

(22) PCT Filed: May 6, 2011

(86) PCT No.: PCT/EP2011/057306
§ 371 (c)(1),
(2), (4) Date: Dec. 13, 2012

(87) PCT Pub. No.: WO2011/157484
PCT Pub. Date: Dec. 22, 2011

(65) Prior Publication Data
US 2013/0087645 A1    Apr. 11, 2013

(30) Foreign Application Priority Data

Jun. 18, 2010 (DE) .......................... 10 2010 024 221

(51) Int. Cl.
| | |
|---|---|
| B02C 13/20 | (2006.01) |
| B22D 25/02 | (2006.01) |
| B02C 4/30 | (2006.01) |
| B30B 3/00 | (2006.01) |
| B30B 11/18 | (2006.01) |
| B32B 15/01 | (2006.01) |
| C22C 37/10 | (2006.01) |
| C22C 38/02 | (2006.01) |
| C22C 38/04 | (2006.01) |
| C22C 38/44 | (2006.01) |
| C22C 38/56 | (2006.01) |
| B22D 13/00 | (2006.01) |

(52) U.S. Cl.
CPC ............... *B22D 25/02* (2013.01); *B02C 4/305* (2013.01); *B22D 13/00* (2013.01); *B30B 3/005* (2013.01); *B30B 11/18* (2013.01); *B32B 15/011* (2013.01); *C22C 37/10* (2013.01); *C22C 38/02* (2013.01); *C22C 38/04* (2013.01); *C22C 38/44* (2013.01); *C22C 38/56* (2013.01); *B02C 2210/01* (2013.01); *B02C 2210/02* (2013.01)

(58) Field of Classification Search
CPC .......... B02C 2/005; B02C 4/30; B02C 4/305; B02C 2210/01; B02C 2210/02
USPC .......................................... 241/235, 293, 300
See application file for complete search history.

(56) References Cited

U.S. PATENT DOCUMENTS

| | | | | |
|---|---|---|---|---|
| 2,964,251 | A * | 12/1960 | Pettit et al. | 241/293 |
| 3,334,996 | A * | 8/1967 | Foster et al. | 420/12 |
| 3,526,939 | A * | 9/1970 | Nikkanen | 29/895.212 |
| 3,881,878 | A * | 5/1975 | Maruta et al. | 428/683 |
| 4,264,357 | A * | 4/1981 | Morgachev et al. | 420/16 |
| 6,171,222 | B1 * | 1/2001 | Lakeland et al. | 492/54 |
| 6,203,588 | B1 * | 3/2001 | Schroder et al. | 51/293 |
| 2008/0191074 | A1 | 8/2008 | Hagedorn et al. | |
| 2011/0061773 | A1 | 3/2011 | Hagedorn et al. | |

FOREIGN PATENT DOCUMENTS

| | | |
|---|---|---|
| DE | 3643259 | 7/1988 |
| DE | 19618143 | 11/1997 |
| DE | 102004043562 | 3/2006 |

* cited by examiner

*Primary Examiner* — Faye Francis
*Assistant Examiner* — Leonel Vasquez
(74) *Attorney, Agent, or Firm* — Greer Burns & Crain, Ltd.

(57) ABSTRACT

A profiled binding for use in a roller press. An alloy containing a high degree of chromium is used. A high wear-resistance of the binding is thereby achieved, said binding not being sensitive with respect to build-up weldings in order to reconstruct the profile after wear.

6 Claims, 2 Drawing Sheets

ROLLER PRESS BIMETALLIC ANNULAR CASING

BACKGROUND OF THE INVENTION

The invention relates to a profiled casing for a roller press for subjecting particulate material to be ground 5 to high-pressure treatment, to a process for producing said profiled casing and to the use of a defined iron alloy having a high chromium content for producing said profiled casing.

For the comminution of particulate and brittle material to be ground, it is known to comminute the material to be ground not by shear stress—as is conventional but rather in an energetically economical manner solely by the application of high pressure in a roller nip. In addition to its energetically favorable use, this type of comminution also has the further advantage of an increased service life of the rollers used to generate the pressure in the roller nip.

In the comminution of rock and very hard and abrasive clinker, there is a predetermined limit to the service life of a roller of a roller press, however, which is caused by the severe abrasion brought about by the material to be comminuted. In the comminution in the roller nip, it is important in addition that the material to be ground passes through the roller nip uniformly and in a controlled manner. For relatively low abrasion and for improved and uniform entry of the material to be ground into the roller nip of the roller press, a process has therefore been adopted whereby the opposing rollers of the roller press are profiled. In the simplest case, this involves longitudinal grooves extending in the axial direction on the surface of the roller, in which compacted material to be ground accumulates to form an autogenous wear-resistant layer and which leads to a more uniform entry of material, even when the material to be ground has a broad grain size distribution or a grain size distribution which varies on average over time.

The structure of a roller for a roller press typically consists of a main roller body with shafts arranged thereon. No special demands are made of the main body in respect of material properties. A casing having the surface quality mentioned in the introduction is then shrunk onto said main body or fastened thereto with other means known to a person skilled in the art. This casing is a substantially cylindrical hollow body of a size on its inner side which is compatible with the main roller body, and on its outer side the casing bears a usually subsequently applied profiling.

DE 10 2004 043 562 A1 discloses an annular casing for a roller press which consists essentially of a nodular cast iron and which has a bainitic microstructure with residual austenite. This material is known for use for producing relatively small individual engine parts made of cast iron and is characterized on the one hand by ductility and on the other hand by a hard surface which forms during use. This material is generally referred to as ADI (Austempered Ductile Iron). On account of its properties, this material is outstandingly suitable for use in roller presses, but involves the disadvantage that the metallic microstructure must not be heated significantly above 400° C., so as not to prompt any undesirable phase transformation of the metallic microstructure. This phase transformation leads to significant changes in the physical properties of said material, and therefore the suitability of the material for use in a roller press deteriorates.

Since a casing is generally shrunk onto a main roller body, it is necessary to heat the casing. Under workshop conditions, it is possible to control slow and uniform heating without individual regions of the casing being overheated and therefore the local material properties thereof being changed in the process. This is different at the operating site of the roller presses. To heat the casings at the operating site, use is generally made of flame sources which heat the casing slowly and uniformly. In this heating process, the surface of the casing can be heated significantly above 400° C. when no provisions are made for preventing overheating. The controlled heating requires qualified and trained personnel, who are not always present at the operating site of the roller presses.

A further problem of this, initially very readily suitable, material is that, for build-up welding to carry out repairs or to install, for the first time, 15 longitudinal grooves extending in the axial direction for the purposes mentioned in the introduction, controlled welding conditions likewise have to be observed in order to obtain high-quality build-up weld seams.

This problem will be important at the operating site of a roller press with personnel who are untrained especially in respect of the material properties when existing profilings are to be built up by build-up welds over the course of regular maintenance or material preservation. A conventional seam applied by build-up welding which has been produced without giving consideration to the characteristics of this material appears initially to be strong and of a high quality. During operation, however, the base material lying under the build-up seam breaks and the build-up seams detach from the roller casing. Depending on the treatment of the casing, this is therefore no longer repairable.

DE3643259C1 discloses an alloy which has a high chromium content and is suitable for producing rollers which are used for rolling in hot strip rolling mills. The alloy having a high chromium content which is disclosed therein is distinguished by the fact that the roller forms no impressions during use and does not stick to the rolling stock. Nothing is known from DE3643259C1 in relation to further particular suitable uses of this alloy.

SUMMARY OF THE INVENTION

It is an object of the invention to provide a profiled casing for a roller press for subjecting particulate material to be ground to high-pressure treatment which does not have the disadvantages from the prior art.

According to the invention, it is proposed to provide a casing for a roller press which comprises an iron alloy which has a high chromium content and has the following alloy constituents:

| Element | Min. % by weight | Max. % by weight |
|---------|------------------|------------------|
| C       | 2.70%            | 2.85%            |
| Si      | 0.95%            | 1.02%            |
| Mn      | 0.55%            | 0.64%            |
| P       | 0.0012%          | 0.0027%          |
| S       | 0.022%           | 0.027%           |
| Cr      | 16.90%           | 17.50%           |
| Mo      | 0.40%            | 1.3%             |
| Ni      | 4.35%            | 4.55%            |

The particularly desirable properties of the casing are not, however, provided solely by the material from which the casing is produced, but rather only a subsequent surface profiling or a surface profiling which has already been introduced during casting leads to the product according to the invention.

It has surprisingly been found that the material having a high chromium content as described herein has a plurality of properties which are desirable for a casing for a roller press in conjunction with the profiling.

When used for a casing of a high-pressure roller press, the alloy material having a high chromium content, which is known per se and is suitable for the production of entire rollers for use under hot conditions in hot strip rolling mills in which the alloy having a high chromium content does not stick to the rolling stock, exhibits a desired ductility during cold operation inside the casing, as a result of which the casing becomes insensitive to the passage of material constituents to be ground which cannot be comminuted. An internally brittle material of a casing for a roller press can readily break upon passage of such a material constituent to be ground and thus make the casing unusable. The ductility inside the material considerably reduces this risk as compared to brittle materials. Nevertheless, the material at the surface of the casing is hard enough to have a satisfactory service life when this material is used for producing a casing for a high-pressure roller press.

In particular, the casing made of the material described herein has the property of exhibiting a surface structure which can easily be repaired by build-up welding, a property which to date is unknown and is determined by tests alone.

A profiled casing as defined herein, which is produced from a single material in a centrifugal casting process or in a static casting process and in this case already has surface grooves made through the molded body in the axial direction or has axial grooves which have been worked in by machining or by grinding, can be reconditioned at the operating site by build-up welding with relatively simple means. The resistance of the material at the surface under heat in conjunction with the ductile properties of the material inside the cast body combined with a desired surface hardness makes the casing according to the invention outstandingly suitable for use in a high-pressure roller press.

In contrast to an initially non-profiled casing, the profiled casing has other properties. A non-profiled casing only has a hard surface profiling as a result of build-up welding, with the diameter being increased by the build-up welding. This regularly has to be removed and reapplied in the course of refurbishment. In contrast to this, the casing which is profiled here by subsequently introducing grooves in the axial direction or by molding in axial grooves has the property that the profile combs can always be rebuilt.

When the roller according to the invention is being reconditioned, a remnant of the profile combs of the casing always remains, and these serve as a reception foundation for a build-Up weld. The build-up welding also succeeds in establishing the high-quality connection between the build-Up weld seam and the profile comb using simple means, which can be controlled at the operating site of the roller.

BRIEF DESCRIPTION OF THE DRAWINGS

The invention is explained in more detail with reference to the figures which follow.

In the figures.

DETAILED DESCRIPTION OF THE PREFERRED EMBODIMENTS

Figure 1:
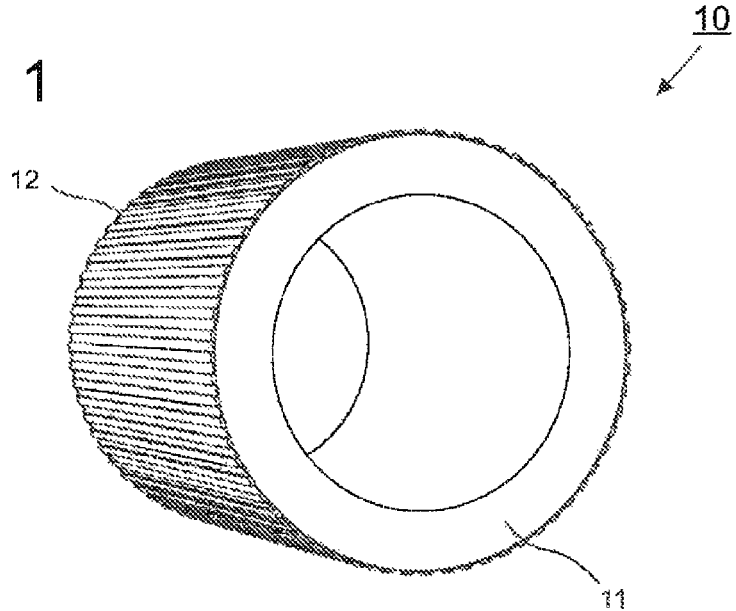
FIG. 1 shows a profiled casing.
Figure 2:
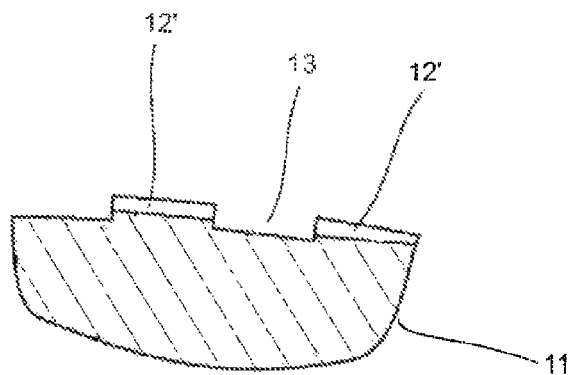
FIG. 2 shows a section of the surface of a casing built up by build-up welding.

FIG. 1 shows a casing 10 according to the invention for a roller press, which has a main casing body 11 and an outer profiling with profile combs 12. According to the invention, it is proposed to select the material of the casing 10 with the aforementioned alloy 15 constituents and to equip the casing 10 with the profile combs 12, where the profile combs 12 have already been molded into the casing 10 during the casting or are shaped subsequently by introducing profile grooves 13 extending in the axial direction (FIG. 2).

The ductility of the main casing body 11 is such that the casing tolerates shrinkage onto a main roller body (not shown here) and also tolerates mechanical loading, which, for example, arises as a result of the passage of a body which cannot be comminuted in the roller nip, such as a relatively large piece of hard metal.

To produce the casing, use is made of a simple process in which firstly a cylindrical hollow body is produced by static casting or centrifugal casting, and then axial longitudinal grooves are introduced onto the surface of the cylindrical hollow body. For the selection of the alloy of the surface of the cylindrical hollow body, it is important for said alloy to have the following composition:

| Element | Min. % by weight | Max. % by weight |
| --- | --- | --- |
| C | 2.70% | 2.85% |
| Si | 0.95% | 1.02% |
| Mn | 0.55% | 0.64% |
| P | 0.0012% | 0.0027% |
| S | 0.022% | 0.027% |
| Cr | 16.90% | 17.50% |
| Mo | 0.40% | 1.3% |
| Ni | 4.35% | 4.55% |

In an embodiment of the invention, the cylindrical hollow body has an inner cylindrical component part and an outer cylindrical component part. The outer cylindrical component part is represented as described above. The inner cylindrical component part, by contrast, has a different composition than the outer cylindrical component part, a composition which is without chromium, molybdenum and nickel, as represented below:

| Element | Min. % by weight | Max. % by weight |
| --- | --- | --- |
| C | 2.80% | 3.60% |
| Si | 1.60% | 2.60% |
| Mn | 0.156% | 0.45% |
| P | 0.012% | 0.060% |
| S | 0.011% | 0.056% |
| Cr | — | — |
| Mo | — | — |
| Ni | — | — |

In this case, the cylindrical hollow body is produced by composite casting.

The axial longitudinal grooves are either already introduced by molding in during the casting or are introduced into the surface of the cylindrical hollow body by grinding or by machining after the cylindrical hollow body has cooled.

FIG. 2 shows that profile combs 12' sit on the worn profile combs 12. These profile combs 12' are build-up welds which are subsequently applied to the profile combs 12 by build-up welding for repairing and for rebuilding a worn casing 10. The selection of the material makes it possible to repair the casing weighing many tons by build-up welding using simple means.

Figure 3:
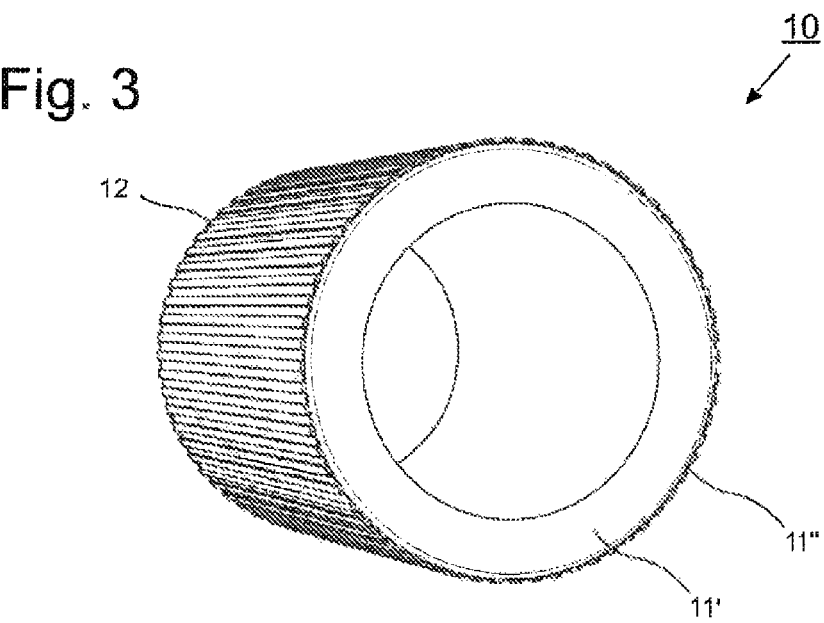
FIG. 3 shows a profiled casing with a different composition of individual parts of the casing.

FIG. 3 finally shows a casing having different material compositions for the inner component part 11' of the casing and the outer part 11" of the casing. The inner part 11' of the casing has the aforementioned composition without chromium, nickel and molybdenum, whereas the outer component part of the casing has the aforementioned composition containing chromium, nickel and molybdenum.

In an embodiment of the invention, it is proposed that the inner component part of the casing amounts to 50% of the weight of the casing, preferably 80%, particularly preferably amounts to more than 90% of the weight of the casing. The casings with the small weight proportion of the chromium-containing alloy are distinguished by a high hardness, which is insensitive to build-up welds on the profile combs, the profile combs serving as a foundation for a build-up weld, and by the ductility of the substantially chromium-free material of the inner component part of the casing.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

LIST OF REFERENCE SIGNS

10 Casing
11 Main casing body
11' Inner part
11', Outer part
12 Profile comb
12' Build-up weld
13 Profile groove

The invention claimed is:

1. A casing having a profiling defined by profile combs for a roller press for subjecting particulate material to be ground to high-pressure treatment, comprising:
material at an outer surface of the casing being an iron alloy having the following alloy constituents with the following % by weight:

| Element | Min. % by weight | Max. % by Weight |
|---------|------------------|------------------|
| C       | 2.7%             | 2.85%            |
| Si      | 0.95%            | 1.02%            |
| Mn      | 0.55%            | 0.64%            |
| P       | 0.0012%          | 0.0027%          |
| S       | 0.022%           | 0.027%           |
| Cr      | 16.90%           | 17.50%           |
| Mo      | 0.40%            | 1.30%            |
| Ni      | 4.35%            | 4.55%            | wherein the profiling worked in on the surface of the rollers is worked in by one of casting in a mold, by subsequent machining of the surface and by grinding.

2. The profiled casing as claimed in claim 1, wherein the material of an inner component part of the casing is an iron alloy having the following alloy constituents with the following % by weight:

| Element | Min. % by weight | Max. % by Weight |
|---------|------------------|------------------|
| C       | 2.8%             | 3.6%             |
| Si      | 1.6%             | 2.60%            |
| Mn      | 0.15%            | 0.45%            |
| P       | 0.012%           | 0.060%           |
| S       | 0.011%           | 0.056%           |
| Cr      | —                | —                |
| Mo      | —                | —                |
| Ni      | —                | —                |

3. The profiled casing as claimed in claim 2, wherein the proportion of the inner component part of the casing is at least 50% by weight.

4. The profiled casing as claimed in claim 2, wherein the proportion of the inner component part of the casing is at least 80% by weight.

5. The profiled casing as claimed in claim 2, wherein the proportion of the inner component part of the casing is at least 90% by weight.

6. The profiled casing as claimed in claim 1, wherein the profiling additionally has a build-up weld on the profile combs.

* * * * *